United States Patent [19]

Jaffe et al.

[11] Patent Number: 4,992,101
[45] Date of Patent: Feb. 12, 1991

[54] PROCESS FOR THE PREPARATION OF OPAQUE DIKETOPYRROLO-PYRROLE PIGMENTS

[75] Inventors: Edward E. Jaffe, Wilmington, Del.; Fridolin Bäbler, Marly, Switzerland

[73] Assignee: Ciba-Geigy Corporation, Ardsley, N.Y.

[21] Appl. No.: 409,987

[22] Filed: Sep. 19, 1989

Related U.S. Application Data

[63] Continuation of Ser. No. 181,864, Apr. 15, 1988, abandoned.

[51] Int. Cl.$^5$ ............................................ C08K 5/3415
[52] U.S. Cl. .................................................... 106/498
[58] Field of Search ........................................ 106/498

[56] References Cited

U.S. PATENT DOCUMENTS

| | | | |
|---|---|---|---|
| 4,259,488 | 3/1981 | Von Der Crone | 106/498 |
| 4,541,872 | 9/1985 | Jaffe | 106/495 |
| 4,579,949 | 4/1986 | Rochat et al. | |
| 4,632,704 | 12/1986 | Babler | 106/498 |
| 4,720,305 | 1/1988 | Iqbal et al. | 106/494 |
| 4,760,144 | 7/1988 | Jaffee | 546/49 |

Primary Examiner—Mark L. Bell
Assistant Examiner—David M. Brunsman
Attorney, Agent, or Firm—Stephen V. O'Brien

[57] ABSTRACT

Process for the preparation of opaque 1,4-diketopyrrolo-[3,4-c]pyrroles of the formula

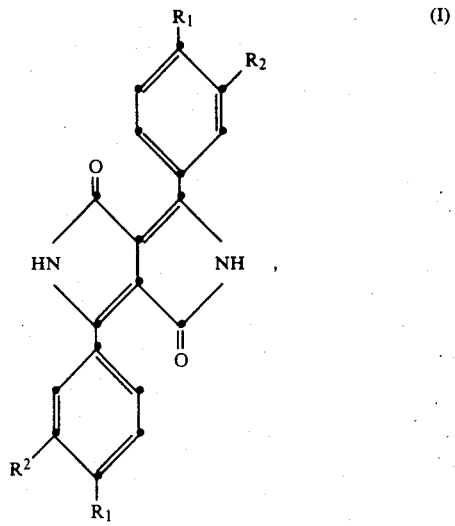

wherein one of $R_1$ and $R_2$ is hydrogen, halogen or $C_1$-$C_4$-alkyl and other is hydrogen, which process essentially consists of milling the pigment in an alcohol and in the presence of a base at a temperature below 50° C., the resulting product being a highly crystalline readily dispersable diketopyrrolopyrrole pigment having outstanding color strength, purity of shade and saturation.

11 Claims, No Drawings

PROCESS FOR THE PREPARATION OF OPAQUE DIKETOPYRROLO-PYRROLE PIGMENTS

This application is a continuation of application Ser. No. 181,864, filed April 15, 1988 now abandoned.

The present invention relates to a process for the preparation of opaque diketopyrrolopyrrole pigments having outstanding color strength, purity of shade and saturation, by wet milling in an alcohol-base system.

It is known from U.S. Pat. No. 4,579,949 that a more opaque pigment form can be obtained by heating diketopyrrolopyrrole pigments in water or an organic solvent. Organic solvents having a boiling point above 80° C., e.g. xylenes, chlorobenzene, nitrobenzene, pyridine, cyclohexanone, ethylene glycol monomethyl ether or dimethylformamide are preferred. In U.S. Pat. No. 4,632,704 there is described a process for the preparation of high yield pigments, e.g. diketopyrrolopyrrole pigments, by protolysis of the pigment salt obtained by treating the crude pigment with a strong base or of the pigment salt obtained in the course of the synthesis, which process comprises treating said pigment salt, in an organic solvent, with water such that the organic solvent is simultaneously removed during the protolysis. The pigments so obtained have a particularly fine crystalline form and are distinguished by excellent colour strength and transparency. In U.S. Pat. No. 4,720,305 there is stated that by subjecting a diketopyrrolopyrrole pigment mixture to aftertreatment in water or in an organic solvent (preferably above 80° C.) and to subsequent communition, such as wet grinding, particularly transparent pigment forms are obtained.

It has now been found that by wet milling certain diketopyrrolopyrrole pigments in an alcohol-base system without heating, very surprisingly an opaque pigment form is obtained which shows an outstanding color strength, excellent purity of shade and unexpected high saturation.

Accordingly, the present invention relates to a process for the preparation of opaque 1,4-diketopyrrolo-[3,4-c]pyrroles of the formula

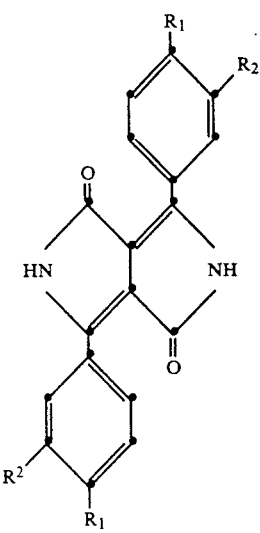

(I)

wherein one of $R_1$ and $R_2$ is hydrogen, halogen or $C_1-C_4$-alkyl and the other is hydrogen, which process essentially consists of milling the pigment in an alcohol and in the presence of a base at a temperature below 50° C., preferably between 10° and 40° C.

Substituents defined as halogen may be for example fluorine, preferably bromine and in particular chlorine.

Substituents defined as $C_1-C_4$-alkyl may be for example methyl, ethyl, n-propyl, isopropyl, n-butyl, sec.-butyl or tert.-butyl. Tert.-butyl and especially methyl are preferred.

$R_2$ is preferably hydrogen. Most preferably both $R_1$ and $R_2$ are hydrogen.

A variety of alcohols are applicable to produce the opaque pigment form including low boiling alcohols, e.g. alkanols such as methanol, ethanol, butanol and pentanols and glycols such as ethylene glycol. The most suitable are methanol and ethanol. Likewise, a variety of inorganic and organic bases can be used including alkali metal hydroxides such as sodium hydroxide, potassium hydroxide or lithium hydroxide and quaternary ammonium hydroxides such as benzyltrimethylammonium hydroxide. Sodium and potassium hydroxide are preferred.

The alcohol is generally present in an amount ranging from 5 to 25 times the weight of pigment, and preferably 10 to 16 times. An appropriate concentration range of base is 2 to 50%, based on the weight of the pigment and preferably 20 to 40%. Inorganic bases can be added as 15 to 70%, preferably 25 to 50% aqueous solution, organic bases at 100% concentration or at least as 50% aqueous solution. The preferred concentration of base, however, changes with the nature of the alcohol. At the desirable base concentration range, there is no visible formation of the diketopyrrolopyrrole potassium, sodium or quaternary ammonium salt, which when formed can be recognized due to its partial solubility in the alcohol with bluish-red coloration. However, during the milling operation, as new surfaces are generated, the mechanism of particle growth is believed to involve formation of a very small concentration of the salt, which is more soluble in alcohol than the diketopyrrolopyrrole itself and thus subject to particle growth followed by alcoholysis to the pigment. This dynamic particle ripening system eventually permits particle growth to the desirable equilibrium size.

The apparatus used for the grinding can be any device for subjecting the pigment and carrier to mechanical forces in a liquid medium. Apparatus of this type is known in a relatively large number of embodiments. They are based, for example, on the principle of a large velocity gradient produced in a liquid medium or on a sudden change of direction, or, in particular, on the impacting action or mutual friction of particles of the grinding medium, such as metal, glass or ceramic spheres, plastic granules or grains of sand, which are set in motion by the rotation of the vessel or by vibrators or stirrer-like devices, for example in glass or ceramic bead mills.

The milling operation proceeds by methods known in the art, generally by charging the crude diketopyrrolopyrrole, alcohol and base to an appropriate mill, introducing the milling elements, milling the system at a temperature below 50° C., preferably between 10° and 40° C. and isolating the resulting diketopyrrolopyrrole pigment. The milling is preferably conducted in a ball mill using sand, glass or ceramic grinding beads of 0.8 to 2.5 mm size. The most preferred grinding beads are made from crystalline zirconia phase and amorphous silica phase by fusion of the oxides (product of Quartz Products Corporation).

If desired, various dispersants, extenders or particle growth inhibitors can be introduced by the alcohol/base milling operation, provided the additives are not subject to inactivation by the basic medium. Simple addition of anionic, cationic, or nonionic surfactants to the liquid milling operation, assuming the materials are not water soluble, will cause them to come out in a uniform manner on the surface of the pigment and consequently alter the pigment behavior. Additionally, introduction of as little as 3-6%, by weight, based on weight of pigment of a dispersant (e.g. DISPER-BYK® 160, BYK Chemie) after milling produces a product which by drawdown in lithographic varnish shows somewhat increased gloss relative to a product prepared without the dispersant.

The pigment can be isolated directly from the milled slurry after grinding media separation by filtration and washing the presscake with alcohol or also by separating the pigment slurry from the milling media by means of alcohol and/or water dilution and milling media washing with either solvent, followed by alcohol distillation from the mixed alcohol-water slurry. The alcohol can thus be recovered, and pigment isolated from a nonflammable slurry by filtration. After isolation, the pigment is washed with water until free of base.

It can also be advantageous to add specific amounts of texture improving agents preferably to the isolated pigment after milling. Suitable texture improving agents are, in particular, fatty acids of not less than 18 carbon atoms, for example stearic or behenic acid or the amides or metal salts thereof, preferably magnesium salts, as well as plasticizers, waxes, resin acids such as abietic acid, colophonium soap, alkyl phenols or aliphatic alcohols such as stearyl alcohol or vicinal diols such as dodecane-1,2-diol, and also modified colophonium/maleate resins or fumaric acid/colophonium resins. The texture improving agents are preferably added in amounts of 0.1 to 30% by weight, most preferably of 2 to 15% by weight, based on the final product. A peculiar property of the pigments obtained by the process of the present invention is their high crystallinity.

Pigmented systems which contain the pigment obtained by the process of the present invention as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amino and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplastis, aninoplasts and rubber. The pigment may also be present in admixture with natural, regenerated or synthetic fibers, such as glass, silicate, asbestos, wood cellulose, acetylcellulose, polyacrylonitrile, polyester, polyurethane and polyvinyl chloride fibers or mixtures of the same, and also in powders, for example organic or inorganic pigments. With the pigment obtained by the process of the invention there are obtained prints, paint and varnish coatings, coverings, shaped articles, such as sheets, threads, plates, blocks, granulates and rods with a brilliant red color of excellent durability.

The mixtures of substances which contain as active coloring ingredient the opaque red pigment obtained by the instant wet milling process, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, non-drying oils, drying oils, lacquers, varnishes, plastics or rubber. Finally, it is also possible to work up the pigment by dry mixing with organic or inorganic masses, granulates, fibrous materials, powders and other pigments, to form mixtures of substances.

In addition to its excellent hiding power, outstanding color strength and purity of shade with very high saturation, the pigments obtained by the process of the invention also show good allround fastness properties, such as fastness to light and weathering, overspraying, migration and heat as well as excellent rheological properties.

The pigments obtained by the instant wet milling process are preferably suitable for coloring aqueous and/or solvent-containing varnishes, especially automotive varnishes.

The following examples further illustrate the embodiments of this invention.

EXAMPLE 1

In a 500 ml wide-necked glass flask with screw cap, 14 g of crude 3,6-diphenyl-1,4-diketopyrrolo-[3,4-c pyrrole, 15 g of 30% aqueous sodium hydroxide solution and 180 ml of methanol together with 350 ml of ceramic beads having a diameter of 1.6 to 2.5 mm and consisting on average of about 69% of $ZrO_2$ and 31% of $SiO_2$ are rotated for 48 hours at 20°-25° C. on a roller gear table such that the centrifugal forces are greater than the gravitational forces, so that the beads remain on the wall of the flask during rotation (corresponding to a speed of 65-100 rpm).

The ceramic beads are thereafter separated, the pigment suspension is filtered, and the filter cake is washed with methanol until free from alkali, dried at 80° C. in a vacuum drier and pulverized to give 13.6 g of red pigment. When incorporated in plastics and varnishes, this pigment gives opaque red colorations of high purity and saturation as well as of excellent fastness to light, head and weathering.

EXAMPLE 2

The procedure of Example 1 is repeated, except that the flask is shaken on a Turbula laboratory shaker supplied by the firm of Willy A. Bachofen, Basle (CH). A pigment having comparably good properties is obtained.

EXAMPLE 3

The procedure of Example 2 is repeated, except that 350 ml of glass beads having an average diameter of 1 mm are used instead of ceramic beads. A pigment having comparably good properties if obtained.

EXAMPLE 4

The procedure of Example 1 is repeated using crude 3,6-bis(4-chlorophenyl)-1,4-diketopyrrolo-[3,4-c]pyrrole instead of 3,6-diphenyl-1,4-diketopyrrolo-[3,4- c]pyrrole, affording a pigment that gives bluish-red opaque colorations of excellent color strength and purity.

EXAMPLE 5

The procedure of Example 4 is repeated using 3,6-bis(4-bromophenyl)-1,4-diketopyrrolo-[3,4-c]pyrrole instead of 3,6-bis(4-chlorophenyl)-1,4-diketopyrrolo-[3,4-c]pyrrole and 10 g instead of 15 g aqueous sodium hydroxide solution. When incorporated in plastics and varnishes, the resultant pigment gives bluish-red colorations of excellent color strength and purity.

EXAMPLE 6

The procedure of Example 4 is repeated using 7.0 g of 50% aqueous potassium hydroxide instead of 15 g of 30% aqueous sodium hydroxide solution. A red pigment having comparably good properties is obtained.

EXAMPLE 7

In a 100 ml wide-necked glass flask with screw cap, 2.5 g of crude 3,6-bis(4-methylphenyl)-1,4-diketopyrrolo-[3,4-c]pyrrole, 2.5 g of 30% aqueous sodium hydroxide and 37 ml of methanol together with 68 ml of ceramic beads having a diameter of 1.6 to 2.5 mm and consisting on average of about 69% of $ZrO_2$ and 31% of $SiO_2$ are rotated for 60 hours at 20°–25° C. on a roller gear table such that the centrifugal forces are greater than the gravitational forces, so that the beads remain on the wall of the flask during rotation (corresponding to a speed of 70–105 rpm).

The ceramic beads are thereafter separated, the pigment suspension is filtered, and the filter cake is washed with methanol until free from alkali, dried in a vacuum drier at 80° C. and pulverized to give 2.4 g of a red pigment. When incorporated in plastics and varnishes, this pigment gives scarlet opaque colorations of excellent hiding power, purity and saturation, as well as of excellent fastness to light, heat and weathering.

EXAMPLE 8

The procedure of Example 1 is repeated using non-aqueous ethanol instead of methanol, to give a red pigment having comparably good properties.

EXAMPLE 9

A 2.85 liter mill is charged with 2500 g of ceramic beads ranging in size from 1.6 to 2.5 mm and consisting on average of about 69% $ZrO_2$ and 31% $SiO_2$, 50 g of crude 3,6-diphenyl-1,4-diketopyrrolo[3,4-c]pyrrole, 1000 ml methanol and 75 g 44% aqueous potassium hydroxide. The mill is rotated for 72 hours at a temperature of 20°–27° C. and 65–70 rpm, which is about 70% of critical speed. The mill is discharged onto a screen which retains the ceramic beads. The beads are washed with 800 ml of methanol, essentially all pigment being collected as a slurry. The slurry is transferred to a four-neck flask equipped with a stirrer, thermometer and condenser. Steam is passed through the slurry and methanol together with some water is distilled off. The temperature slowly rises to 93° C. as the methanol is distilled off and is maintained for 10 minutes whereupon the distillation is discontinued. The product is isolated by filtration from the hot slurry and the pigment washed free of base with warm water. After drying at 80° C., 48.2 g of pigment are obtained, which, on incorporation into plastics and varnishes, gives opaque red colorations with outstanding color strength, purity of shade and saturation as well as excellent fastness properties.

EXAMPLE 10

A mixture of
- 130 g of steatite balls (diameter=8 mm)
- 47.5 g of a thermosetting acrylic resin varnish consisting of
  - 41.3 g of VIACRYL ® VC 373 acrylic resin, 60% (ex VIANOVA Kunstharz AG),
  - 16.3 g of MAPRENAL ® TTX melamine resin, 55%, (ex HOECHST AG),
  - 32.8 g of xylene,
  - 4.6 g of ethyl glycol acetate,
  - 2.0 g of butyl acetate, and
  - 1.0 g of silicone oil A ®, 1% in xylene (ex Bayer), and
- 2.5 g of the 1,4-diketopyrrolo-[3,4-c]-pyrrole pigment obtained in Example 1 is dispersed in a 200 ml glass bottle with twist-off stopper for 72 hours on a roller gear bed. The steatite balls are removed and then
- 8.0 g of the dispersed masstone mixture,
- 0.6 g of ALCOA ® aluminum paste (60–65% aluminum content, ex Aluminium Corp. of America),
- 1.0 g of methyl ethyl ketone and
- 18.4 g of the above thermosetting acrylic varnish are thoroughly mixed and the mixture is sprayed onto aluminium sheets and subsequently baked for 30 minutes at 130° C., to give very strong opaque red metal effect finishes of excellent fastness properties.

Comparably good finishes are obtained by using a pigment of any one of Examples 2 to 9 instead of the pigment of Example 1.

EXAMPLE 11

A mixture of 130 g of steatite balls having a diameter of 8 mm, 47.5 g of an alkyd/melamine stoving varnish consisting of 60 g of alkyd resin (Beckosol ® 27-320, Reichhold Chemie AG), 60% in xylene, 36 g of melamin resin (Super-Beckamin ® 13-501, Reichhold Chemie AG), 50% in a 2:1 mixture of xylene/butanol, 2 g of xylene and 2 g of ethylene glycol monomethyl ether, and 2.5 g of the diketopyrrolopyrrole pigment obtained in Example 1 are dispersed in a 200 ml glass flask with twist-off cap for 120 hours on a roller gear bed. After separating the steatite balls, the dispersed full shade mixture is sprayed onto aluminum sheets and subsequently stoved for 30 minutes at 130° C. to give very strong opaque red finishes with a very high saturation and excellent fastness properties.

EXAMPLE 12

A mixture of 1.0 g of the pigment obtained in Example 4, 1.0 g of an antioxidant (®IRGANOX 1010, ex Ciba-Geigy AG) and 1000 g of high density polyethylene granules (®Vestolen A 60-16, ex Chem. Werke Huls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then posttreated for 5 minutes at 180° C. The mouldings are coloured in strong red shades of excellent fastness properties.

EXAMPLE 13

0.6 g of each one of the pigments obtained in the Examples 1 to 9 are mixed each with 67 g of polyvinyl chloride, 33 g of dioctyl phthalate, 2 g of dibutyltin laurate and 2 g of titanium dioxide and each mixture is processed to a thin sheet on a two roll mill for 15 minutes at 160° C. The PVC sheets so obtained are colored in a very strong opaque red shade which is fast to migration and light.

EXAMPLE 14

1000 g of polypropylene granules (®DAPLEN PT-55, ex Chemie Linz) and 20 g of a 50% pigment preparation consisting of 10 g of the pigment obtained in Example 4 and 10 g of magnesium behenate are thoroughly mixed in a mixing drum. The granules so obtained are melt spun at 260°–285° C. to red filaments of good light-fastness and textile fibre properties.

EXAMPLE 15

8 g of the pigment obtained in Example 4 are thoroughly dispersed in a DISPERMAT® disperser (ex Hediger, Basserdorf) with 1 mm glass beads in a solution consisting of 21.5 g of cellulose acetobutyrate (25% in butyl acetate), 1 g of zirconium octoate 6 (NUODEX®), 12 g of an aromatic solvent (SOLVESSO® 150, ex ESSO), 17.5 g of butyl acetate and 13 g of xylene.

After removal of the glass beads, the to dispersion is mixed with 24 g of polyester resin (DYNAPOL® H 700, 60%, ex DYAMIT NOBEL) and 3 g of melamine resin (MAPRENAL® MF 650, 55%, ex HOECHST AG). The pigment varnish so obtained is sprayed onto aluminum sheets and then baked at 130° C., to give strong opaque red finishes of excellent gloss.

EXAMPLE 16

The procedure of Example 15 is repeated, except that 0.48 g of a dispersant (DISPERBYK® 160, BYK Chemie) is used in addition to 8 g of the pigment. Red colorations having even better rheological properties and excellent gloss are obtained.

What is claimed is:

1. A process for increasing the opacity of 1,4-diketopyrrolo[3,4-c]-pyrrole pigments of the formula

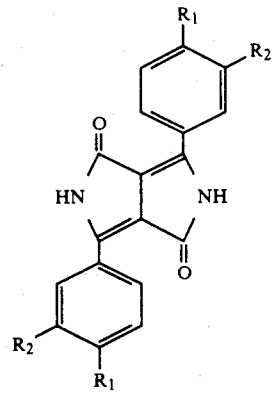

wherein one of $R_1$ and $R_2$ is hydrogen, halogen or $C_1$–$C_4$-alkyl and the other is hydrogen, which process consists essentially of milling the pigment in an alcohol which is present in an amount ranging from 5 to 25 times the weight of the diketopyrrolopyrrole and in the presence of a base which is present in an amount ranging from 2 to 50% by weight of the diketopyrrolopyrrole at a temperature below 50° C.

2. The process of claim 1, wherein said alcohol is selected from the group consisting of alkanols and glycols.

3. The process of claim 1, wherein said alcohol is selected from the group consisting of methanol, ethanol, butanol, pentanol and ethylene glycol.

4. The process of claim 1, wherein said alcohol is methanol or ethanol.

5. The process of claim 1, wherein said base is an alkali metal hydroxide.

6. The process of claim 1, wherein said base is sodium or potassium hydroxide.

7. The process of claim 1, wherein said base is a quaternary ammonium hydroxide.

8. The process of claim 1, wherein said alcohol is methanol and said base is sodium hydroxide.

9. The process of claim 1, wherein the milling occurs between 10° and 40° C.

10. The process of claim 1, wherein in formula I $R_1$ is hydrogen, chlorine, methyl or tert.-butyl and $R_2$ is hydrogen.

11. The process of claim 1, wherein in formula I $R_1$ and $R_2$ are hydrogen.

* * * * *